Jan. 15, 1957  J. R. HUBER  2,777,668
LOAD BINDER DEVICE
Filed March 20, 1953  2 Sheets-Sheet 1

INVENTOR
J. Richard Huber
BY Harris S. Campbell
ATTORNEY

Jan. 15, 1957 J. R. HUBER 2,777,668
LOAD BINDER DEVICE
Filed March 20, 1953 2 Sheets-Sheet 2

INVENTOR
J. Richard Huber
BY Harris S. Campbell
ATTORNEY

United States Patent Office 2,777,668
Patented Jan. 15, 1957

2,777,668
LOAD BINDER DEVICE

John Richard Huber, Warrington, Pa., assignor to Eastern Rotorcraft Corporation, Doylestown, Pa., a corporation of Pennsylvania Application March 20, 1953, Serial No. 343,613

2 Claims. (Cl. 254—72)

This invention relates to chain engaging and tightening apparatus and is more particularly concerned with devices suitable for use with chains used for binding a load of cargo to a vehicle.

In transporting heavy cargo, for example large pipes, structural steel, logs, heavy machinery, etc., by motor truck or rail car, it is necessary to secure the load to prevent it from shifting position. For this purpose lengths of chain are often used to secure the load, the chain being attached to the body or frame of the vehicle. For engaging the chain and providing for adjusting its length and tightening it in position on the load, a load binder device is normally used. Some of these devices operate on the eccentric principle with a lever which moves over dead-center position to provide for shortening and tightening the chain. It is an object of the present invention to provide a load binder device of improved construction, including relatively short length thereby permitting it to be used more effectively, particularly where available space is at a premium.

Another object of the invention is the provision of the load binder in which an increased length of adjustment is incorporated without increasing the length of the device itself. In the present arrangement this is accomplished by providing a telescoping relationship between the adjusting parts.

A further object of the invention is the provision of improved tightening mechanism incorporating ratchet mechanism which allows a large mechanical advantage to be obtained in applying the tightening load to the chain and at the same time permits relatively small increments of spacing for the adjusted positions.

An additional object of the invention is to provide a handle mechanism which may be quickly folded to an inoperative position alongside the body of the load binder or which may be moved to provide a convenient operating location approximately perpendicular to the load binder. An additional feature of the present arrangement is the provision of double acting motion in which tightening movement is provided by moving the handle in either direction.

How the foregoing and other objects and advantages incidental to the invention are attained will be clear by reference to the following description of the drawings in which—

Figure 1:
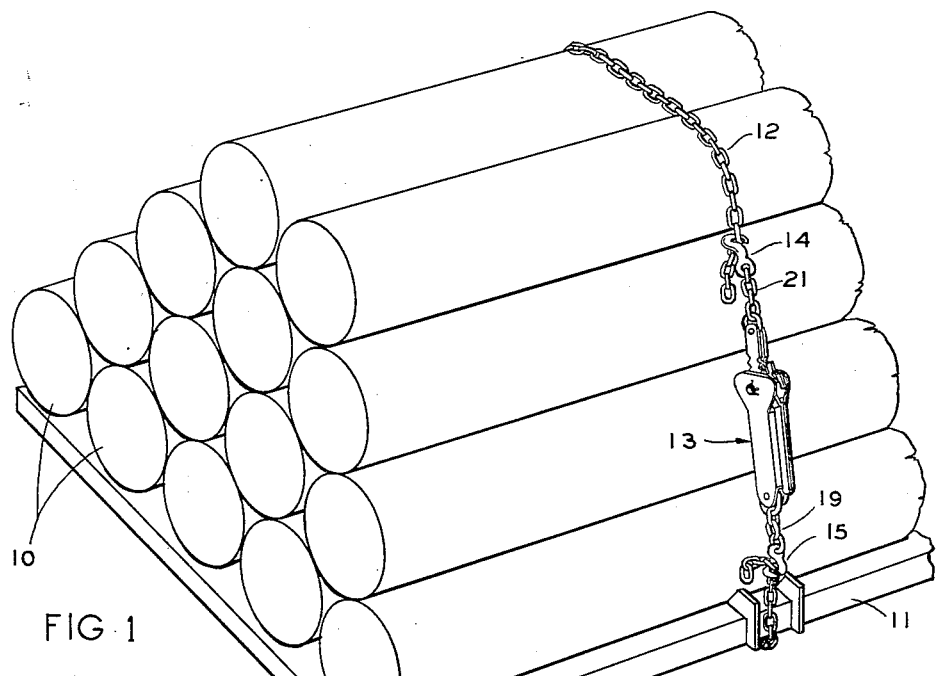
Figure 1 is a perspective view illustrating one manner in which the load binder of the present invention may be used.

Referring to the figures, Figure 1 shows a load which may consist of pipes 10 carried by vehicle body 11, a chain 12 being used to wrap around the pipes 10. Chain 12 is anchored to the vehicle body by means of the load binder unit 13 which may be attached to chain 12 by means of a grab hook 14 connected by a short piece of chain to the unit. Another grab hook 15 may be used to engage in similar fashion the other end of chain 12 after it has passed under the vehicle body 11.

Figure 2:
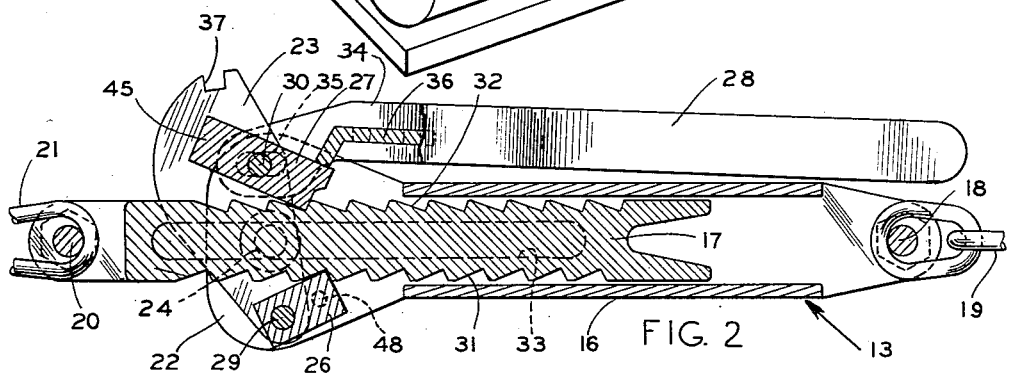
Figure 2 is a longitudinal sectional view taken generally along the line 2—2, Figure 3, the handle being shown in folded position.
Figure 3:
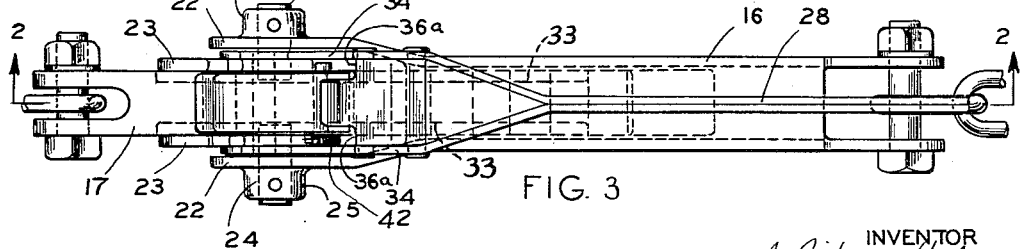
Figure 3 is a top plan view of the apparatus shown in Figure 2.

The details of the load binder 13 are more clearly disclosed in Figures 2 and 3 where it will be seen that an external housing 16 encloses the movable portion 17 of the load binder. At one end of the body 16 a pin 18 provides for the anchoring of the unit either directly or by means of chain 19. At the opposite end of the apparatus pin 20 provides for suitable anchorage such as to the chain 21. At the end of the body 16 opposite to the anchor pin 18 an extended portion 22 of the frame 16 provides for support of the operating mechanism.

A pair of transverse links 23 are supported on pivots 24—24 which are supported in cantilever fashion in bosses 25—25 formed on the frame plates 22. Attached to the links 23 are two ratchet pawl members 26 and 27. Ratchet member 26 is located at the end of links 23 opposite the handle 28 and is supported on links 23 by means of a pivot 29. Ratchet member 27 is pivotally supported on links 23 by means of pivot 30. These ratchet pawls 26 and 27 engage ratchet teeth 31 and 32 which are formed at opposite sides of the rectangular telescoping member 17. It will be noted that teeth 31 and 32 are in staggered relation to each other. An elongated depression or slot 33 is provided at each side of the member 17 and main pivots 24—24 extend into the slots 33 thereby providing for support of the telescoping member 17 to retain it in proper relative position to the body 16 and at the same time slots 33 act as a limiting stop for both the extension and retraction positions of the telescoping member 17.

The handle member 28 is shown in Figures 2 and 3 in folded position. The end of the handle is attached to the links 23 and is composed of two side plates 34—34 which are spaced apart at a distance sufficient to engage the outside of the links 23. The handle sides 34—34 are connected to the links 23 by means of a pivot 30 which also supports the ratchet member 27. Slots 35 in side plates 34—34 permit the support of the handle in a fashion which allows it to move relative to the links 23 to provide for folding into collapsed position.

Figure 4:
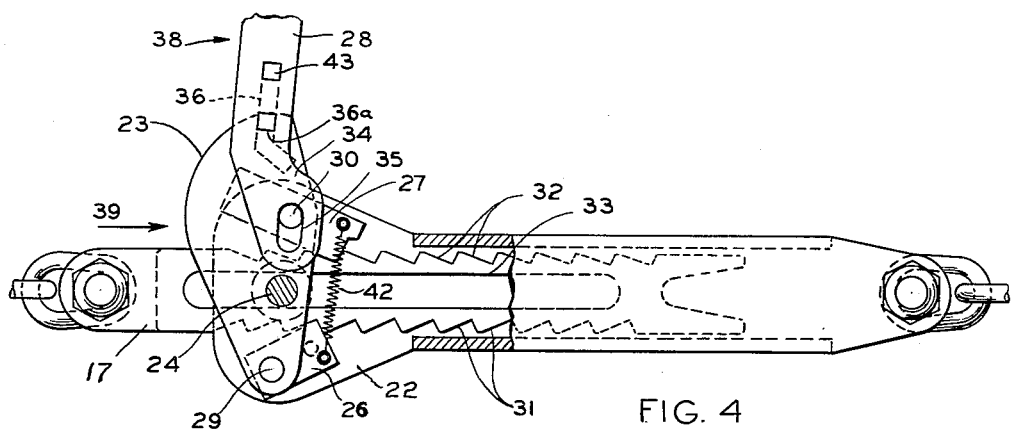
Figure 4 is a side elevational view with part of the front plate removed and showing the handle in operating position with the handle moving in a rearward direction.
Figure 5:
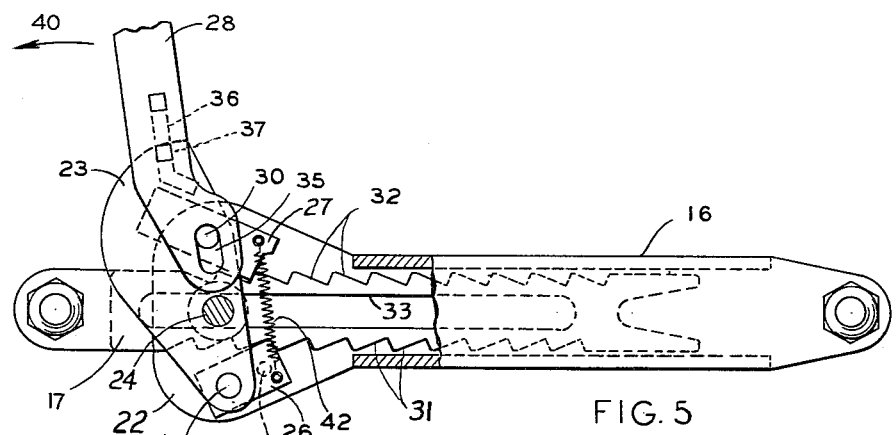
Figure 5 is a view similar to Figure 4 with the handle and operating parts moved to a forward position.

To move the handle into operative position as shown in Figures 4 and 5, it is swung upwardly until edge 36a of member 36 is in position to engage slots 37 in the end of links 23. Slots 35 in handle plates 34 permit longitudinal displacement of the handle to allow engagement of the member 36 in the slot 37 thereby providing for the transfer of the handle moments through the links 23 to the latches 26 and 27. In this position the handle may be moved back and forth causing the links 23 to rock on pivots 24—24.

In Figure 4 the handle is shown after it has moved in the direction of arrow 38 to a position at the end of a stroke. In this position the upper latch member 27 is in contact with the third notch 32 while the lower pawl member 26 has moved in the reverse direction to the handle motion from its position in the fourth notch 31 to the position shown where it is in the third notch 31. This motion of the handle causes the telescoping member 17 to move into the housing 16 in the direction of arrow 39.

In Figure 5 the handle 28 has been moved forwardly in the direction of arrow 40 to an extreme forward position. As previously mentioned, at the end of the rearward stroke shown in Figure 4 the pawl 26 had moved to engage the third notch 31. Thus movement of the handle in the direction of arrow 40 permitted pawl 27 to disengage the third notch 32 and move forwardly so that at the end of the forward stroke as indicated in Figure 5, pawl member 27 is in position to drop into the second notch 32. From this position the pawl 27 is again effective on the rearward stroke in the direction of arrow 38. Thus when moving rearwardly the upper pawl 27 is in effective engagement and serves to move the telescoping member 17 in a shortening direction into the housing 16. On the forward stroke the pawl 26 becomes effective and also causes continued motion of the member 17 in the same shortening direction. It will be observed that with a single stroke the member 17 is moved a distance equal to one-half of a notch. The disengaged ratchet moving forwardly also travels one-half a notch to permit engagement with the next notch.

When all of the slack has been removed from the chain and the initial tension applied thereto the handle 28 may be folded down out of the way by lifting it slightly until the edge 36a is disengaged from the slot 37 which allows the handle to be folded about the pivot 30 into the position shown in Figure 2. The spring 42 which reacts between the pawl member 26 and the pawl member 27 causes them to be retained in position against the respective teeth 31 and 32 to hold the load and transfer it from the member 17 to the frame 16. This single spring 42 also acts to cause proper pawl operation during the adjusting actuation.

Figure 6:
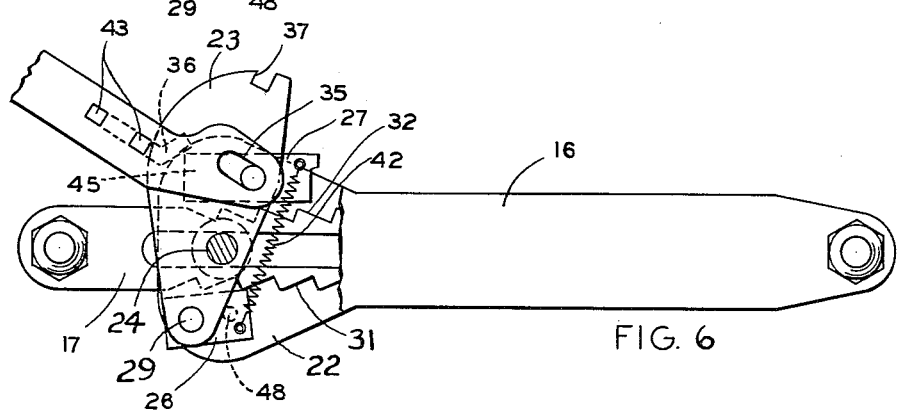
Figure 6 is a view showing the handle and latch mechanism in released position.

In order to release the load it is necessary to unlatch the member 17 from the pawls. To accomplish this, a special member 36 for engaging the upper pawl 27 is mounted on the handle member 28. This is best illustrated in Figure 6 where it will be seen that device 36 is mounted on the handle 28, being riveted thereto by square projections 43. When it is desired to hold the pawl 27 in released position handle 28 may be swung around relative to links 23 as shown in Figure 6 to engage the projection 45 at the end of the upper pawl 27. This lifts the pawl 27 out of engagement with the notches 32. With the pawl 27 disengaged the sliding member 17 may be released by applying a tension load to it. Pulling on ratchet member 17 causes pressure on pawl 26 which swings link 23 into an angled position as indicated in Figure 6 where pawl 26 is also disengaged from teeth 31. It will be noted that pin 48 attached to pawl 26 acts as a limiting position stop so that the spring 42 cannot bring the pawl 26 into engagement with notches 31 when the links 23 are in extreme deflected position. In this position the member 17 may be drawn out to its fully extended position where it is ready for attachment to the load and tightening action. It should be noted that it is only when pawl 27 is deliberately held out of engagement that the member 17 may be moved outwardly.

Operation of the load binder is relatively simple. Chain 12 is first passed around the load and into position for securing. With the load binder parts in extended position the grab hooks are attached to the chain in the nearest convenient link. Then by actuating the handle 28 back and forth the slack may be quickly removed from the chain and initial tension applied. The handle is then folded to the position shown in Figure 2 so that it is out of the way and protected against accidental engagement. In this position the end of member 36 rests over pawl 27 to prevent accidental disengagement. When it is desired to release the load, the handle 28 is swung to apply pressure to end 45 of pawl 27 in the manner previously described to move the pawl members 26 and 27 out of engagement with the ratchet teeth 31 and 32 and permit release and extension of the telescoping member 17. To release the chain from the load binder when it is under load the same procedure is followed as for withdrawing the telescoping member 17. Swinging the handle 28 to the position in Figure 6 releases pawl 27 and the unbalanced load automatically moves links 23 to position where pawl 26 is released.

From the foregoing description it will be evident that I have provided an improved type of load binder in which special latch adjustment mechanism is incorporated having rapid double acting action to assure quick adjustment with adequate mechanical advantage for operation. The particular latch mechanism to provide double action requires a minimum number of parts and at the same time provides a reduced increment of adjustment (one-half notch travel per stroke) which assures full tightening benefits without the possibility of damaging cargo such as might occur in the case of a coarser adjustment. This reduced increment of movement is obtained while still retaining the advantage of large ratchet teeth with adequate strength. The folding handle arrangement not only improves the compactness and reduces storage problems of the apparatus but also eliminates the possibility of inadvertent operation once final adjustment had been made because in folded position the mechanical advantage of the device has been reduced to a point where inadvertent operation is prevented. With the construction in which both latches are effective in holding the load the unit transfers the full capacity in a balanced force condition with both latches operative, thus providing greater strength and reliability. The staggered tooth relationship allows greater strength in the telescoping member and more advantageous positioning of the pawls.

I claim:

1. A load securing device having two elongated members arranged for relative axial movement with respect to each other, each of said members having a terminal connection for attaching to a load, one of said members having a series of serrations along two sides thereof, the other of said members incorporating a pivot at the end opposite its terminal connection, a transverse link supported on said pivot, a pair of pawl parts movably attached to said link, one pawl in position for engagement with each series of serrations, an actuating handle pivotally and slidably connected to said link, said pawl parts being spring loaded into engagement with said serrations, one of said pawl parts having stop means to limit its position with respect to said link in the engaging direction, and a part supported on said handle and movable with respect to said link, said part being engageable with the other of said pawls for holding it out of engagement with said serrations to permit extension of the serrated member.

2. A load securing device having an outer elongated housing of rectangular section, a telescoping rectangular member having a series of ratchet teeth formed on two opposite sides, ratchet mechanism including a link mounted on a pivot member supported in the outer housing, an elongated slot in said telescoping member, said pivot member extending into said slot and acting as a position limiting stop for the motion of said telescoping member, a pair of spring loaded pawls supported on said link, one engageable with each series of ratchet teeth, and a manual actuator attached to said link for oscillation thereof for length adjustment of the device, the attachment between said link and said manual actuator incorporating a pivot and slot construction to permit slidable and pivotal motion of the handle from an operating position to a folding position, said link having a notch, a projection from said actuator to engage said notch when in operating position, said actuator being movable on its pivot to a position in which it contacts one of said pawls to cause disengagement from the ratchet teeth, and a stop reacting between the other of said pawls and said link to permit disengagement of said other pawl.

References Cited in the file of this patent

UNITED STATES PATENTS

| 917,789 | Oliver | Apr. 13, 1909 |
| 1,166,691 | Keller et al. | Jan. 4, 1916 |
| 1,203,617 | Hargis | Nov. 7, 1916 |
| 1,569,346 | Wilson et al. | Jan. 12, 1926 |
| 1,885,128 | Montgomery | Nov. 1, 1932 |
| 1,888,389 | Kremko | Nov. 22, 1932 |
| 2,638,318 | Nampa | May 12, 1953 |